United States Patent
Kang

(10) Patent No.: US 9,174,764 B2
(45) Date of Patent: Nov. 3, 2015

(54) EXTERNAL SUPPORTING COVER FOR USER DEVICE

(71) Applicant: Samsung Electronics Co., Ltd., Gyeonggi-do (KR)

(72) Inventor: Il-Dong Kang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/221,597

(22) Filed: Mar. 21, 2014

(65) Prior Publication Data

US 2014/0311927 A1 Oct. 23, 2014

(30) Foreign Application Priority Data

Apr. 18, 2013 (KR) .................. 10-2013-0042673

(51) Int. Cl.
*B65D 5/52* (2006.01)
*G06F 1/00* (2006.01)

(52) U.S. Cl.
CPC ............. *B65D 5/5206* (2013.01); *G06F 1/00* (2013.01)

(58) Field of Classification Search
CPC .............. A45C 11/00; A45C 13/005; A45C 2011/001–2011/003; B65D 5/5206; G06F 1/16
USPC ............. 206/45.2, 45.23–45.26, 45.28, 320; 248/454–456, 459, 460; 361/679.55–679.57
See application file for complete search history.

(56) References Cited

U.S. PATENT DOCUMENTS

| | | | |
|---|---|---|---|
| 8,138,869 B1 | 3/2012 | Lauder et al. | |
| 8,143,982 B1 | 3/2012 | Lauder et al. | |
| D658,188 S | 4/2012 | Diebel | |
| 8,253,518 B2 | 8/2012 | Lauder et al. | |
| 8,264,310 B2 | 9/2012 | Lauder et al. | |
| 8,312,991 B2 * | 11/2012 | Diebel et al. | 206/45.24 |
| 8,328,008 B2 * | 12/2012 | Diebel et al. | 206/45.24 |
| 8,360,384 B2 * | 1/2013 | Farris-Gilbert et al. | 248/459 |
| 8,807,333 B1 * | 8/2014 | Cooper et al. | 206/45.23 |
| 8,875,879 B2 * | 11/2014 | Diebel et al. | 206/320 |
| 8,887,910 B2 * | 11/2014 | Ashley et al. | 206/320 |
| 2012/0068797 A1 | 3/2012 | Lauder et al. | |
| 2012/0211613 A1 | 8/2012 | Yang et al. | |
| 2014/0083883 A1 * | 3/2014 | Elias | 206/320 |

FOREIGN PATENT DOCUMENTS

KR 20-2012-0007825 U 11/2012
KR 10-2012-0140504 A 12/2012

* cited by examiner

*Primary Examiner* — Bryon Gehman
(74) *Attorney, Agent, or Firm* — Cha & Reiter, LLC.

(57) ABSTRACT

An external cover of a user device includes: an upper cover; a lower cover; and a hinge connecting the upper and lower covers for pivoting the upper cover and lower cover over a front surface and a rear surface of the user device, wherein the upper cover opens and closes a front surface of the user device and comprises at least two or more folding lines along a longitudinal direction of the upper cover such that the upper cover is divided into at least three supports when folded along each of the at least two or more folding lines, and wherein the lower cover holds the user device on an inside surface, and slip preventing units are provided on at least two end surfaces of an outside surface of the second cover for providing enhanced friction between the second cover and a flat location so that the lower cover maintains a stable state in various holding mode of the lower cover facing the hinge, respectively, so that the lower cover maintains a holding state in various holding modes.

19 Claims, 4 Drawing Sheets

EXTERNAL SUPPORTING COVER FOR USER DEVICE

CLAIM OF PRIORITY

This application claims the priority under 35 U.S.C. §119 (a) to Korean Application Serial No. 10-2013-0042673, which was filed in the Korean Intellectual Property Office on Apr. 18, 2013, the entire content of which is hereby incorporated by reference in its entirety.

BACKGROUND

1. Field of the Invention

The present disclosure relates to a user device including a smart phone and a tablet PC or other similar devices or other similar devices, and more particularly, to an external cover which can hold a portable user device while protecting an exterior of the user device.

2. Description of the Related Art

In general, users mount an external cover to a portable user device to protect the user device. The external cover is detachably provided to the user device, and protects a front surface and/or a rear surface of the user device. Since the user device is frequently carried, impacts such as a falls or other contact with objects while being carried may occur, and damage to an outer surface such as a scratches or dents may occurs on an outer surface thereof. Thus, the user device to minimize wear, damage and long term product reliability and appearance needs to be protected by the external cover.

In addition, the above-described external cover is recognized as an accessory which has various colors and textures to show a sense of fashion and appealing appearance to display its own personality, and provides a luxurious feeling by using an outer skin of various materials, for example, a leather material having various colors.

Especially, since a display of a user device such as a smart phone or a tablet PC is located on a front surface of the user device, the front surface of the user device is protected by the external cover. A generally distributed external cover includes an upper cover and a lower cover, and the upper and lower covers are connected to each other by hinges. The upper cover is rotated to be folded to and unfolded from the front surface of the user device, that is, a display screen of the user device and then may be folded over the back or rear side of the device. However, when the user device is used, it is inconvenient to type on the user device or view a displayed screen. For example, when the user device is typed on, it is convenient to type on the user device in a slightly or shallow angle inclined state, and when the displayed screen is viewed, it is convenient to view the screen in a heavily or more steeply inclined state. In order to solve the inconvenience, a separate portable holder is provided, or a holder is provided in the user device.

However, it may be inconvenient for the user to always carry the holder, and the user device in which the holder is provided may be awkward or cumbersome to carry and may-not have an appealing appearance.

Thus, the external cover of the user device is configured to perform a holding function, or a separate component is attached to the external cover so that the external cover can be used as a holder of the user device.

Covers for user devices having a holding function according to the related art are disclosed in detail in Korean Utility Model Application No. 2012-0007825 and Korean Patent Application No. 2012-0140504.

However, the cover of the user device according to the related art is folded for a holding function in various holding modes to support the user device in an inclined state, but includes a separate component, for example, a magnet or a sensor to maintain a folded state. If a magnet is provided in the external cover, for example, a steel plate should be provided. However, since a weight of the steel plate is heavy, it can make it more difficult to carry the external cover.

Especially, if the magnet or the steel plate is provided in the external cover to maintain various holding modes, a performance of the user device deteriorates as the magnet can effect various internal components of the user device such as, for example the display. In order to prevent this, a magnetic shielding component should be additionally used, which causes a rise in manufacturing costs and also possibly the weight of the external cover.

SUMMARY

The present invention provides an external cover of a user device which excludes the use of a magnetic body/a steel plate to achieve light weight.

The present invention also provides an external cover of a user device which excludes the use of a magnetic material/a steel plate to prevent deterioration of a performance of the user device and minimize a rise in price and rise in weight. The present invention also provides an external cover of a user device which is conveniently used in a holding mode for viewing the user device, or a typing mode while excluding the use of a magnetic material/a steel plate.

The present invention also provides the external cover of the user device which prevents a slip in a holding mode for viewing the user device, or a typing mode to provide a stable holding mode while excluding the use of a magnetic material/a steel plate.

In order to solve the above-described problems, there is provided an external cover of a user device, including: an upper cover; a lower cover; and a hinge connecting the upper and lower covers for pivoting the upper cover and lower cover over a front surface and a rear surface of the user device, wherein the upper cover opens and closes a front surface of the user device and comprises at least two or more folding lines along a longitudinal direction of the upper cover such that the upper cover is divided into at least three supports when folded along each of the at least two or more folding lines, and wherein the lower cover holds the user device, and slip preventing units are provided on at least two end surfaces of an outside surface of the second cover for providing enhanced friction between the second cover and a flat location so that the lower cover maintains a stable state in various holding mode of the lower cover facing the hinge, respectively, so that the lower cover maintains a holding state in various holding modes.

In accordance with another aspect of the present invention, there is provide an external cover of the user device, including: a first cover; a second cover; and a hinge for connecting the first and second covers for pivoting the upper cover and lower cover over a front surface and a rear surface of the user device, wherein the first cover holds the user device, and slip preventing units are provided on at least the first and second end surfaces of an outside surface of the second cover for providing enhanced friction between the second cover and a flat location so that the lower cover maintains a stable state in various holding mode so that the external cover inclinedly supports the user device in various holding modes, respectively.

In accordance with another aspect of the present invention, there is provided an external cover of the user device, including; a first cover; a second cover; and hinges connecting the first and second covers for pivoting the upper cover and lower cover over a front surface and a rear surface of the user device, wherein the first cover opens and closes a front surface of the user device, and comprises the first, second, and third folding lines along a longitudinal direction of the upper cover such that the first cover is divided into first, second, third, and fourth supports when folded along each of the at least two or more folding lines, wherein in a first user holding mode, the second support contacts the floor, the fourth support contacts a portion of the lower cover, the first support supports a portion between the lower cover and the second support horizontally, and the third support vertically supports a portion between the second support and the fourth support, and wherein in a second user holding mode, the first support contacts a portion of the lower cover, the third and fourth support horizontally contacts the floor, and the second support vertically supports a portion between the first support and the third support, and supports the held user device.

Other aspects, advantages and salient features of the external cover for user device in accordance with the present invention will become apparent to a person of ordinary skill in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Exemplary embodiments of the present invention will be described herein below with reference to the accompanying drawings to assist in a comprehensive understanding of exemplary embodiments of the invention as defined by the claims and their equivalents. In the following description, well-known functions or constructions are not described in detail since they would obscure the understanding of the subject matter of the present invention in unnecessary detail by a person of ordinary skill in the art with unnecessary detail of the well-known functions and structures.

Therefore, the terms used herein should be understood based on the descriptions made herein in view of the ordinary level of skill in the art. The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

The following description made with reference to the accompanying drawings is provided to help general understanding of the embodiments of the present invention which is defined by the claims and their equivalents. Although various specific details are included to help understanding of the present invention, they are regarded only as exemplary. Thus, those skilled in the art can variously change and modify the embodiments described herein without departing from the scope of the present invention. Further, a description of known functions and configurations will be omitted for clarity so as to not obscure the invention.

A singular form such as 'a', 'an', and 'the' will be construed to include a plurality of referents unless it is defined differently in the context. Thus, for example, 'a component surface' includes one or more surfaces.

The term 'substantially' means that cited characteristics, parameters, or values may not be accurately achieved, and allowable errors, measurement errors, accuracy limits in measurement, deviations, changes, or characteristics may be generated in a degree by which the effects of the present invention are not excluded.

Figure 1:
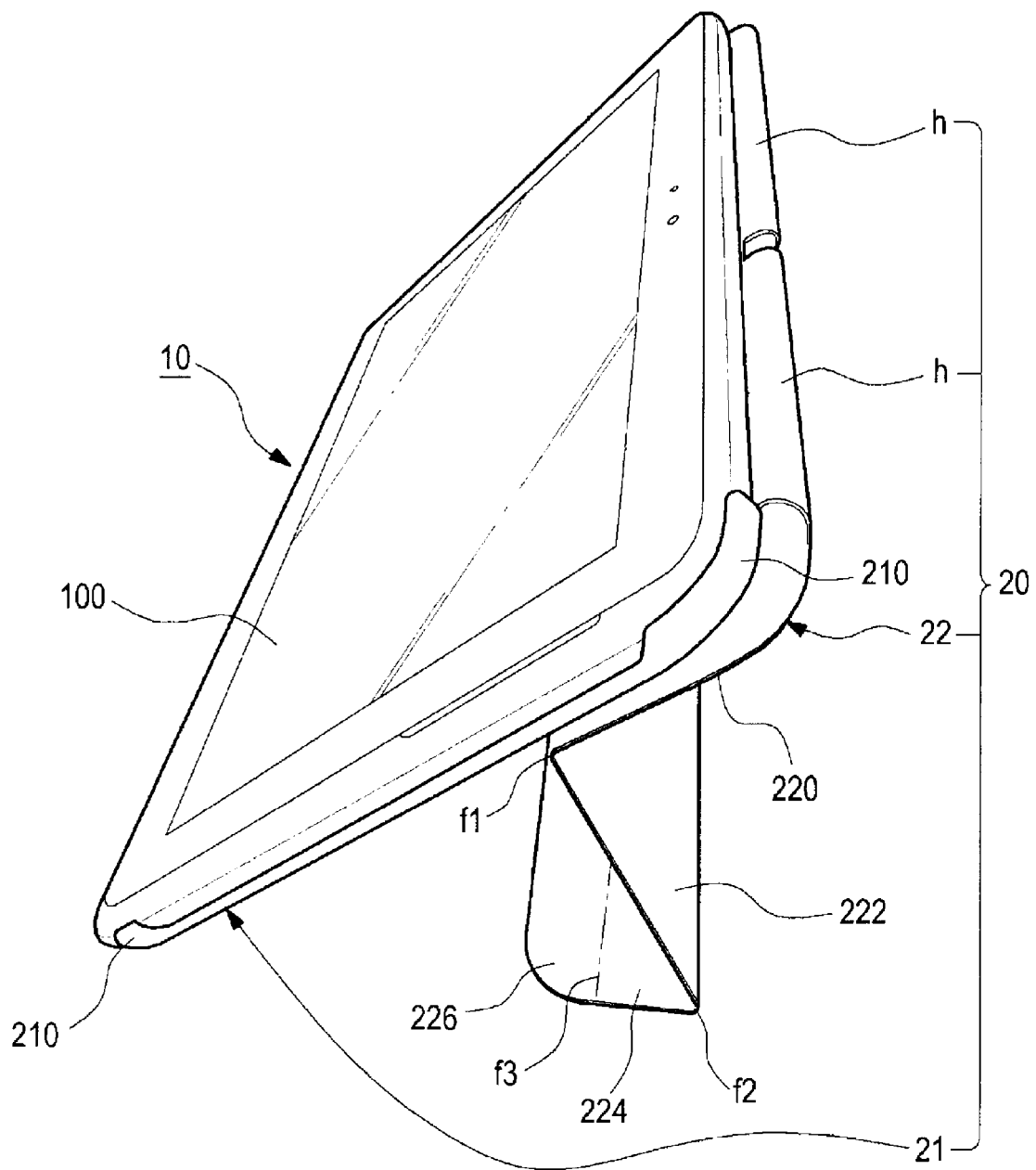
FIG. 1 is a perspective view showing a state in which a user device is held by an external cover according to an embodiment of the present invention, and showing a user holding mode for viewing the user device.
Figure 2:
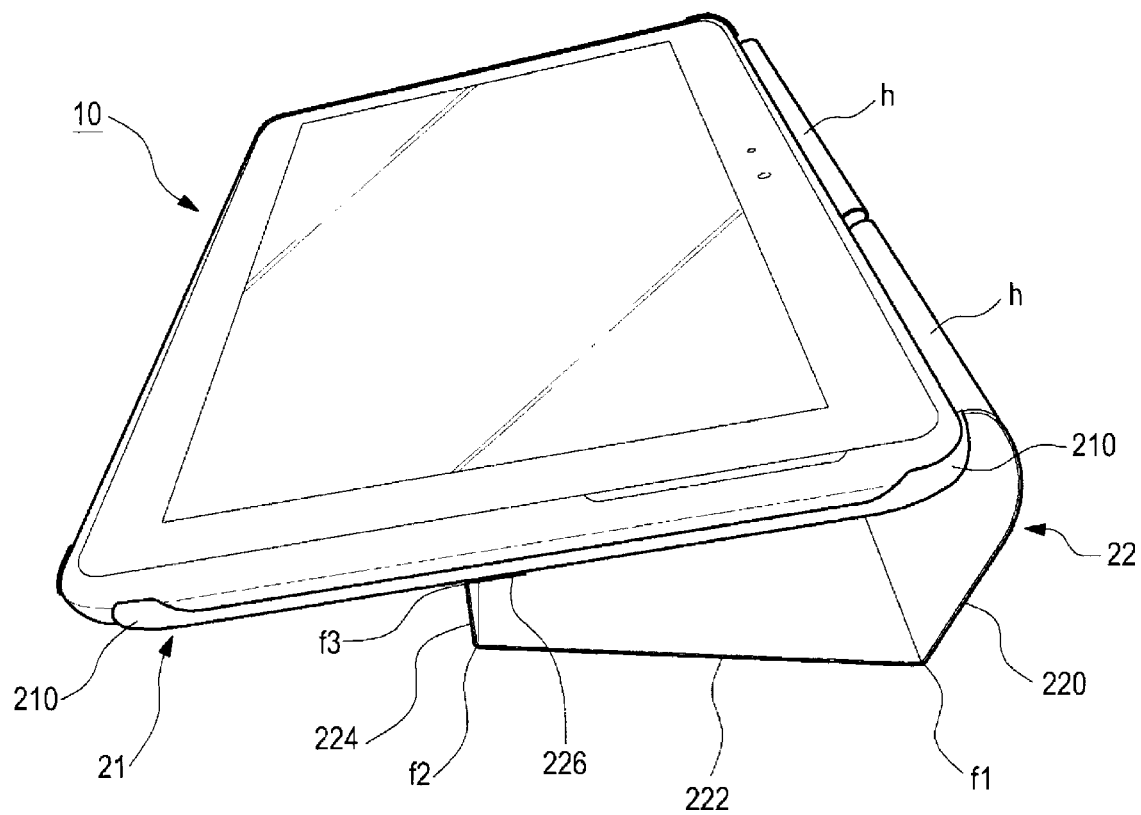
FIG. 2 is a perspective view showing a state in which the user device is held by the external cover according to the embodiment of the present invention, and showing a user holding mode for typing on the user device.

FIG. 1 is a perspective view showing a state in which a user device 10 is held by an external cover 20 according to an embodiment of the present invention, and showing a user holding mode for viewing the display screen at a favorable angle for observing media, text and or other viewable display content on the user device. FIG. 2 is a perspective view showing a state in which the user device 10 is held by the external cover 20 according to the embodiment of the present invention, and showing a user holding mode for facilitating typing on the user device such as in a word processing application or other similar data entry application. As shown in FIGS. 1 and 2, the external cover 20 according to the embodiment of the present invention is a cover by which the user device 10 may be held to be carried or otherwise observed in use. Especially, the external cover 20 refers to an external cover which protects an appearance of the held user device and has various colors and high quality materials as an accessory, and refers to an external cover which does not use a separate fixing/maintaining component. In addition, the user device 10 refers to a portable user device of general electronic products, and especially to a miniaturized/light-weighted mobile communication device.

The user device 10 may be applied to any one of a mobile phone, a palm-sized PC, a personal communication system (PCS), a personal digital assistant (PDA), a handheld PC (HPC), a smart phone, a wireless local area network (LAN) terminal, a laptop computer, a netbook, a notebook, and a tablet PC. The user device may be a tablet PC or a smart phone in the present embodiment, and the user device is assumed to be a tablet PC, and hereinafter a configuration of the external cover according to the embodiment of the present invention will be described below.

A display 100 by which a touch input can be made on a front surface of the user device 10 is disposed on the front surface of the user device 10, and the display 100 is protected by the external cover 20. A touch input unit 100 is disposed on the front surface of the user device 10, and the touch input unit 100 receives and processes a contact, a motion, and a gesture of a finger or a stylus pen. The external cover 20 according to the present embodiment may include a first cover 21 in which the user device 10 is held, a second cover 22 which inclinedly supports the user device 10 while protecting the front surface of the user device 10, a hinge h rotatably connecting the first and second covers 21 and 22, and a slip preventing unit 23 (see FIGS. 3 and 6) supporting the user device inclinedly supported in a holding mode.

Since the first cover 21 is disposed on a bottom surface of the user device 10, the first cover 21 will be referred to as a lower cover, and since the second cover 22 is disposed on a top surface to open and close the user device, the second cover 22 will be referred to as an upper cover. The upper cover 22 is rotatably connected to the lower cover 21 by the hinge h to be folded to or unfolded from the top surface (a display unit) of the user device 10, and serves to perform a holding function together with the lower cover 21 on which the user device 10 is held. In other words, the upper cover can be folded over the top of the display to protect the display, or folded over the bottom surface if the device 10 to provide a surface having a profile that is more easily grasped for holding and carrying.

The lower cover 21 is held while facing the user device 10, and is intentionally held or separated by a stopper 210 provided along a periphery thereof. The stopper 210 is made of a resilient synthetic resin so that the user device 10 can be selectively attached and detached. The resin may include urethane.

Figure 3:
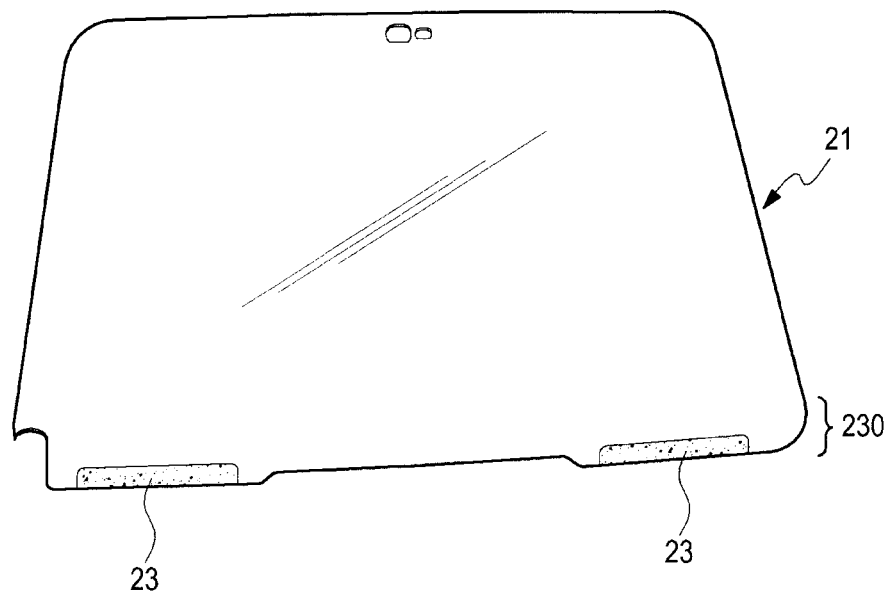
FIG. 3 is a view showing the external cover of a closed state according to the embodiment of the present invention.
Figure 4:
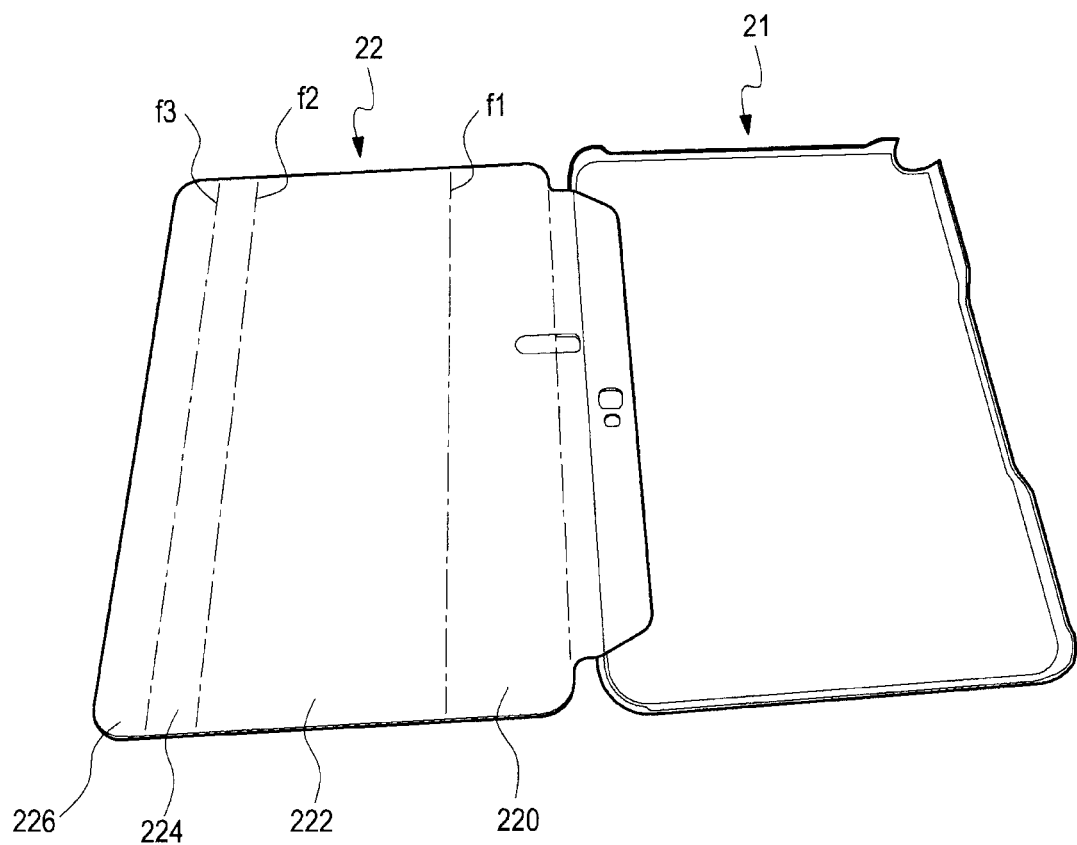
FIG. 4 is a view showing the external cover in a fully opened state according to the embodiment of the present invention.
Figure 5:
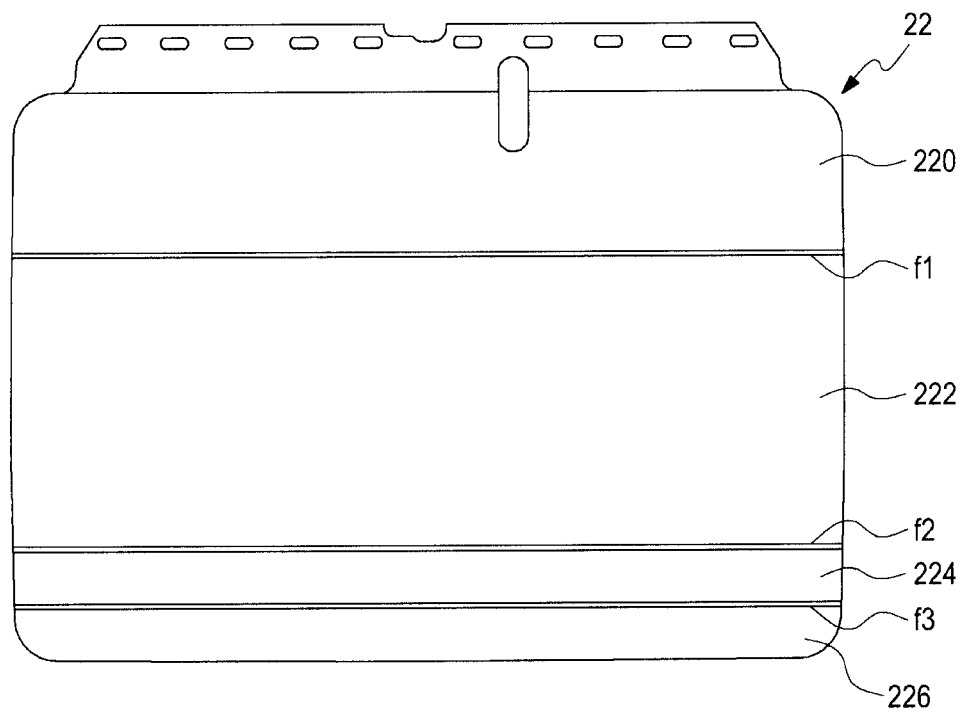
FIG. 5 is a plan view showing an upper cover of the external cover according to the embodiment of the present invention.

As shown in FIGS. 3 to 5, the upper cover 22 may have at least two folding lines parallel to a hinge axis, and may be divided into at least three supports by the folding lines. The upper cover 22 includes first, second, and third folding lines f1, f2, and f3, and includes first, second, third, and fourth supports 220, 222, 224, and 226. The first folding line f1 is closest to the hinge h, and the third folding line f3 is farthest from the hinge h in other words closer to an outer edge 22 of the upper cover. The second folding line f2 is located between the first and third folding lines f1 and f3. Further, the first support 220 is closest to the hinge h, and the fourth support 226 is farthest from the hinge h. The second and third supports 222 and 224 are sequentially located between the first and fourth supports 220 and 226.

The first, second, third, and fourth supports 220, 222, 224, and 226 have substantially rectangle shapes. The second support 222 is widest, and the third and fourth supports 224 and 226 are relatively narrow or small. The first support 220 has an area whose size is between those of areas of the second support 222 and the third support 224. The first, second, and third folding lines f1, f2, and f3 are responsible for a hinge function. Especially, the first, second, and third folding lines f1, f2, and f3 provided in the upper cover 22 have recess shapes, respectively, and are formed to be thinner than the other parts so that the upper cover 22 can be rotated along the folding lines.

As shown in FIGS. 1 and 2, the user device 10 can be held by the lower cover 21 or by the upper cover 22 in various user holding modes. FIG. 1 shows a holding mode in which the held user device 10 is inclinedly supported at an angle between 60 degrees and 90 degrees, and FIG. 2 shows a typing mode in which the held user device 10 is inclinedly supported at an angle of 30 degrees or less. The screen can be conveniently viewed when a displayed screen faces a front side of the user in the holding mode, and the typing mode can be conveniently used when the displayed screen is inclinedly held on a floor or a desk in front of a user for example. The holding function in the typing mode or the holding mode can be realized by folding the first, second, and third folding lines f1, f2, and f3 provided in the upper cover 22 at different angles and by using the first, second, third and fourth supports 220, 222, 224, and 226.

The holding structures of the upper cover 22 in the typing mode and the holding mode will be described below.

In the holding mode shown in FIG. 1, the first support 220 of the upper cover 22 contacts a portion of a lower surface of the lower cover 21, and the third and fourth supports 224 and 226 contact the floor or other support structure such as a desk. The second support 222 supports a portion between the first support 220 and the third support 224. In a more detailed description of an operation of the upper cover 22, the first support 220 is responsible for a function of supporting the user device 10 as a support when the first folding line f1 is folded, more particularly, providing the vertical support. The second support 222 is responsible for a function of determining a holding angle when the second folding line f2 is folded. The third and fourth supports 224 and 226 are responsible for a function of supporting the user device 10 when the second folding line f2 is folded so that the third and fourth supports 224 and 226 contact the floor and thus provide stability along a horizontal or nearly horizontal plane. The third folding line does not need to be folded.

In the typing mode shown in FIG. 2, the second support 222 of the upper cover 22 contacts the floor, and the fourth support 226 contacts a portion of the lower cover 21 to provide a second vertical support in addition to support 220 which maintains the user device in the shallow inclined angle. The first support 220 supports a portion between the lower cover 21 and the second support 222, and the third support 224 supports a portion between the second and fourth supports 222 and 226. In a detailed description of an operation of the upper cover 22, the first support 220 is folded along the first folding line f1, and determines a typing angle as a first support column. When an angle of the first support column is a right angle or an obtuse angle, a typing structure does not collapse even if the user device 10 is held by the lower cover 21. If the second support 222 closely contacts the floor, a base surface having a trapezoidal shape is formed when the upper cover 22 of the typing mode is shown in a lateral direction so that the first and third supports 220 and 224 support a weight of the user device 10. Further, the third support 224 is stood on the floor at a right angle or an obtuse angle as a second support column, and supports the user device 10. The fourth support 226 is folded along the third folding line f3, and is disposed to closely contact a lower surface of the lower cover 21 so that the fourth support 226 supports the user device 10.

Figure 6:
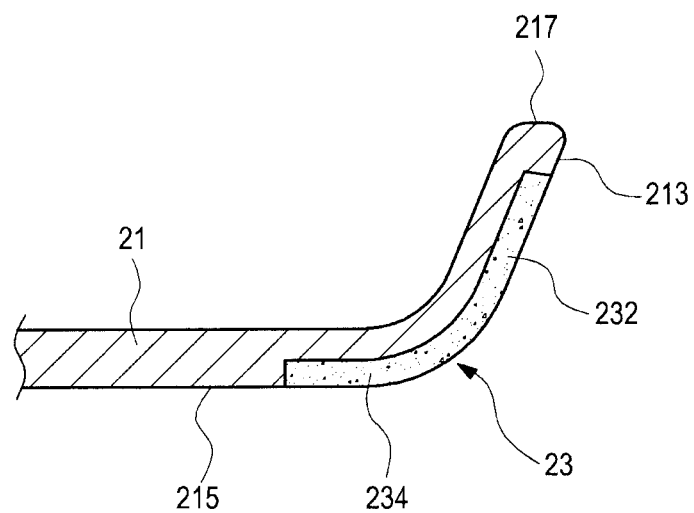
FIG. 6 is a view showing a slip preventing unit mounted to an end of a lower cover of the external cover according to the embodiment of the present invention.

A configuration of a slip preventing unit 23 provided in the lower cover 21 will be described below with reference to FIGS. 3 and 6. It has been already described that the external cover is configured to be optimized in the typing mode and the holding mode for inclinedly holding the user device 10 with the upper and lower cover 21 and 22. The slip preventing unit 23 is responsible for a function of preventing a slip in both the two modes. If the user device 10 is held by the lower cover 21, in either of the two modes (FIG. 1 or 2), the lower cover end 230 contacts the floor (a flat location such as a desk or the ground) to support the user device 10. The slip preventing unit 23 is located at the lower cover end 230. A region of the lower cover end 230 includes three end surfaces of first, second, and third end surfaces 213, 215, and 217, and the first end surface 213 mainly contacts the ground in the holding mode, and the second end surface 215 mainly contacts the ground in the typing mode. Thus, the slip preventing unit 23 extends to first and second portions 232 and 234 covering the first and second end surfaces 213 and 215 to prevent a slip in the two modes, respectively. At least one slip preventing unit 23 may be provided in a longitudinal direction (hinge direction) of the lower cover end 230.

The slip preventing unit 23 may be formed of rubber or silicon whose friction force is excellent, and outer surfaces of the slip preventing units may protrude from the end surfaces 213 and 215 by a predetermined thickness.

The scope of the present invention is not limited to the exemplified example, but those skilled in the art can variously modify the embodiment without departing from the scope of the present invention.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An external cover of a user device, comprising:
an upper cover including a length;
a lower cover; and
a hinge connecting the upper cover and lower covers for pivoting the upper cover and the lower cover over a front surface and a rear surface of the user device,
wherein the upper cover opens and closes a front surface of the user device and comprises at least two or more folding lines along a longitudinal direction extending generally along the length of the upper cover such that the upper cover is divided into at least a first support, a second support, and a third support when folded along each of the at least two or more folding lines, and
wherein the lower cover holds the user device, and at least one slip preventing unit that is provided on at least a first end surface and a second end surface of an outside surface of the lower cover for providing enhanced friction between the lower cover and a flat location so that the lower cover maintains a stable state in various holding modes of the lower cover, respectively, so that the lower cover maintains a holding state in various holding modes, and
wherein the various holding modes include a typing mode for inclinedly supporting the user device held at a shallow angle of 30 degrees or less and a viewing mode supporting the user device held at a steep angle of substantially 60 degrees to 90 degrees.

2. The external cover of claim 1, wherein the slip preventing unit extends to cover first and second end surfaces of the lower cover at an edge distant from the hinge, and supports the user device held in the typing mode or the viewing mode.

3. The external cover of claim 1, wherein the upper cover comprises first, second, and third folding lines along the longitudinal direction of the upper cover and parallel to the hinge, and is divided into the first support, the second support, the third support, and a fourth support when folded along the first, second and third folding lines.

4. The external cover of claim 3, wherein, in the typing mode, the second support horizontally contacts a floor, the fourth support horizontally contacts a portion of the lower cover, the first support vertically supports a portion between the lower cover and the second support, and the third support supports a horizontal portion between the second support and the fourth support.

5. The external cover of claim 3, wherein in the viewing mode, the first support contacts a portion of the lower cover, the third and fourth supports horizontally contacts a floor, and the second support vertically supports a portion between the first support and the third support.

6. The external cover of claim 2, wherein the upper and lower covers do not comprise a magnetic material.

7. The external cover of claim 1, wherein the user device comprises a tablet PC or a smart phone.

8. An external cover of a user device, comprising:
a first cover including an inside surface and an outside surface including first and second end surfaces;
a second cover; and
a hinge for connecting the first cover and the second covers for pivoting the first cover and second cover over a front surface and a rear surface of the user device,
wherein the first cover holds the user device on the inside surface of the first cover, and at least one slip preventing unit are provided on at least the first and second end surfaces of the outside surface of the first cover for providing enhanced friction between the first cover and a flat location so that the first cover maintains a stable state in various holding modes so that the external cover slantedly supports the user device in the various holding modes,
wherein the various holding modes include a typing mode and a viewing mode,
wherein in the typing mode, the user device is inclinedly supported at a shallow angle of 30 degrees or less, and
wherein in the typing mode, the user device is inclinedly supported at a steep angle of substantially 60 degrees to 90 degrees.

9. The external cover of claim 8, wherein the slip preventing unit extends to cover first and second end surfaces of the first cover along an edge distant from the hinge, against the flat location and the user device is held stably and does not slide in either of the typing mode or the viewing mode.

10. An external cover of a user device, comprising:
a first cover;
a second cover including a length; and
a hinge connecting the first cover and the second covers for pivoting the first cover and second cover over a front surface and a rear surface of the user device,
wherein the first cover opens and closes a front surface of the user device, and comprises first, second, and third folding lines along a longitudinal direction extending generally along the length of the second cover such that the first cover is divided into a first support, a second support, a third support, and a fourth support when folded along each of the folding lines,
wherein in a first user holding mode, the second support horizontally contacts a floor, the fourth support contacts a horizontal portion of the lower cover, the first support vertically supports a portion between the lower cover and the second support, and the third support vertically supports a portion between the second support and the fourth support, and
wherein in a second user holding mode, the first support contacts a portion of the lower cover for providing vertical support, the third and fourth supports contacts the floor and provides horizontal support, and the second support vertically supports a portion between the first support and the third support, and supports the user device.

11. An external cover of the user device according to claim 10, wherein the second cover holds the user device, and at least one slip preventing unit are provided on at least two end surfaces of an outside surface of the second cover for providing enhanced friction between the second cover and a flat location so that the second cover maintains a stable state in various holding modes of the second cover, respectively, so that the second cover maintains a holding state in the various holding modes.

12. The external cover of claim 11, wherein the various holding modes include a typing mode and a viewing mode, and wherein the slip preventing unit extends to cover first and second end surfaces of the first cover at an edge distant from the hinge, and supports the user device held in the typing mode or the viewing mode.

13. The first cover of claim 12, wherein the first user holding mode includes the typing mode for inclinedly supporting the user device held at a shallow angle of 30 degrees or less and the viewing mode for inclinedly supporting the user device held at a steep angle of substantially 60 degrees to 90 degrees.

14. The external cover of claim 10, wherein the second cover comprises first, second, and third folding lines along a longitudinal direction of the first cover and parallel to the hinge, and is divided into first, second, third, and fourth supports when folded along the first, second and third folding lines.

15. The external cover of claim 10, wherein the various holding modes include a typing mode, and wherein in the typing mode, the second support horizontally contacts a floor, the fourth support horizontally contacts a portion of the first cover, the first support vertically supports a portion between the first cover and the second support, and the third support supports a horizontal portion between the second support and the fourth support.

16. The external cover of claim 10, wherein the various holding modes include a viewing mode, and wherein in the viewing mode, the first support contacts a portion of the second cover, the third and fourth supports horizontally contacts a floor, and the second support vertically supports a portion between the first support and the third support.

17. The external cover of claim 10, wherein the first cover and the second cover do not comprise a magnetic material.

18. The external cover of claim 10, wherein the user device comprises a tablet PC or a smart phone.

19. The external cover of claim 10, wherein, when the first support contacts a portion of the first cover for providing vertical support, an angle of a support column is a right angle or an obtuse angle.

* * * * *

UNITED STATES PATENT AND TRADEMARK OFFICE
CERTIFICATE OF CORRECTION

| | | |
|---|---|---|
| PATENT NO. | : 9,174,764 B2 | Page 1 of 1 |
| APPLICATION NO. | : 14/221597 | |
| DATED | : November 3, 2015 | |
| INVENTOR(S) | : Il-Dong Kang | |

It is certified that error appears in the above-identified patent and that said Letters Patent is hereby corrected as shown below:

In the claims

Column 7, Claim 1, Line 22 should read as follows:
--...and lower cover for...--

Column 7, Claim 1, Lines 43-44 should read as follows:
--...mode for inclinedly supporting...--

Column 8, Claim 8, Line 9 should read as follows:
--...and the second cover...--

Column 8, Claim 10, Line 35 should read as follows:
--...the second cover for...--

Column 8, Claim 11, Line 61 should read as follows:
--...preventing unit is provided...--

Column 9, Claim 13, Line 7 should read as follows:
--...The external cover of claim 12...--

Signed and Sealed this
Fifteenth Day of March, 2016

Michelle K. Lee
*Director of the United States Patent and Trademark Office*